United States Patent
Chen et al.

(10) Patent No.: US 8,804,486 B2
(45) Date of Patent: Aug. 12, 2014

(54) BASE STATIONS ROUTING TRAFFIC OVER A PACKET BACKHAUL NETWORK TO MULTIPLE ROUTING ELEMENTS

(75) Inventors: Ina Z. Chen, Little Neck, NY (US); Joseph Veltri, Totowa, NJ (US); Qinqing Zhang, Morganville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1861 days.

(21) Appl. No.: 11/681,883

(22) Filed: Mar. 5, 2007

(65) Prior Publication Data
US 2008/0219207 A1    Sep. 11, 2008

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/28* | (2006.01) |
| *H04W 40/00* | (2009.01) |
| *G06F 15/173* | (2006.01) |
| *H04W 92/04* | (2009.01) |
| *H04B 1/74* | (2006.01) |

(52) U.S. Cl.
CPC ............. *H04W 92/045* (2013.01); *H04B 1/745* (2013.01)
USPC ............ 370/217; 370/237; 455/445; 709/239

(58) Field of Classification Search
CPC ..... H04W 92/045; H04W 92/14; H04B 1/745
USPC ......... 370/328, 351–430, 216–258, 315, 329, 370/331, 338; 445/423, 424; 709/239; 379/221.01; 455/424, 445, 561
See application file for complete search history.

(56) References Cited

U.S. PATENT DOCUMENTS

| | | | | |
|---|---|---|---|---|
| 5,933,777 | A | * | 8/1999 | Rahman ......................... 455/450 |
| 6,370,385 | B1 | * | 4/2002 | Bohm et al. .................... 455/450 |
| 6,408,182 | B1 | * | 6/2002 | Davidson et al. ............. 455/433 |

(Continued)

FOREIGN PATENT DOCUMENTS

| | | | |
|---|---|---|---|
| EP | 1727309 | A | 11/2006 |
| GB | 2415857 | A | 1/2006 |
| WO | WO03/105422 | A | 12/2003 |
| WO | WO2006/136660 | A | 12/2006 |

*Primary Examiner* — Dwayne Bost
*Assistant Examiner* — Larry Sternbane
(74) *Attorney, Agent, or Firm* — Duft, Bornsen & Fettig, LLP

(57) ABSTRACT

System, methods, and networks are disclosed that allow base station systems of a wireless communication network to transmit outgoing traffic over a packet backhaul network to multiple routing elements on the MSC side of the network. A base station system described herein identifies a primary routing element and a backup routing element. The primary routing element is the device to which the base station system transmits outgoing traffic under normal operation, and the backup routing element is an alternate to the primary routing element. To transmit traffic over the packet backhaul network, the base station system monitors the availability of the primary routing element. If the primary routing element is available, then the base station system transmits outgoing traffic over the packet backhaul network to the primary routing element. If unavailable, then the base station system transmits outgoing traffic over the packet backhaul network to the backup routing element.

20 Claims, 6 Drawing Sheets

(56) References Cited

U.S. PATENT DOCUMENTS

| | | |
|---|---|---|
| 6,510,219 B1 * | 1/2003 | Wellard et al. ............ 379/221.01 |
| 6,735,184 B1 * | 5/2004 | Davidson et al. ............. 370/316 |
| 6,748,434 B2 * | 6/2004 | Kavanagh ..................... 709/224 |
| 6,934,762 B1 * | 8/2005 | Lange et al. .................. 709/239 |
| 2003/0083071 A1 * | 5/2003 | Wilcox et al. ................. 455/445 |
| 2005/0113078 A1 * | 5/2005 | Deitrich ........................ 455/417 |
| 2007/0030809 A1 * | 2/2007 | Dayama ........................ 370/237 |
| 2008/0056123 A1 * | 3/2008 | Howard et al. ............... 370/225 |
| 2008/0082142 A1 * | 4/2008 | Clark et al. ..................... 607/60 |

* cited by examiner

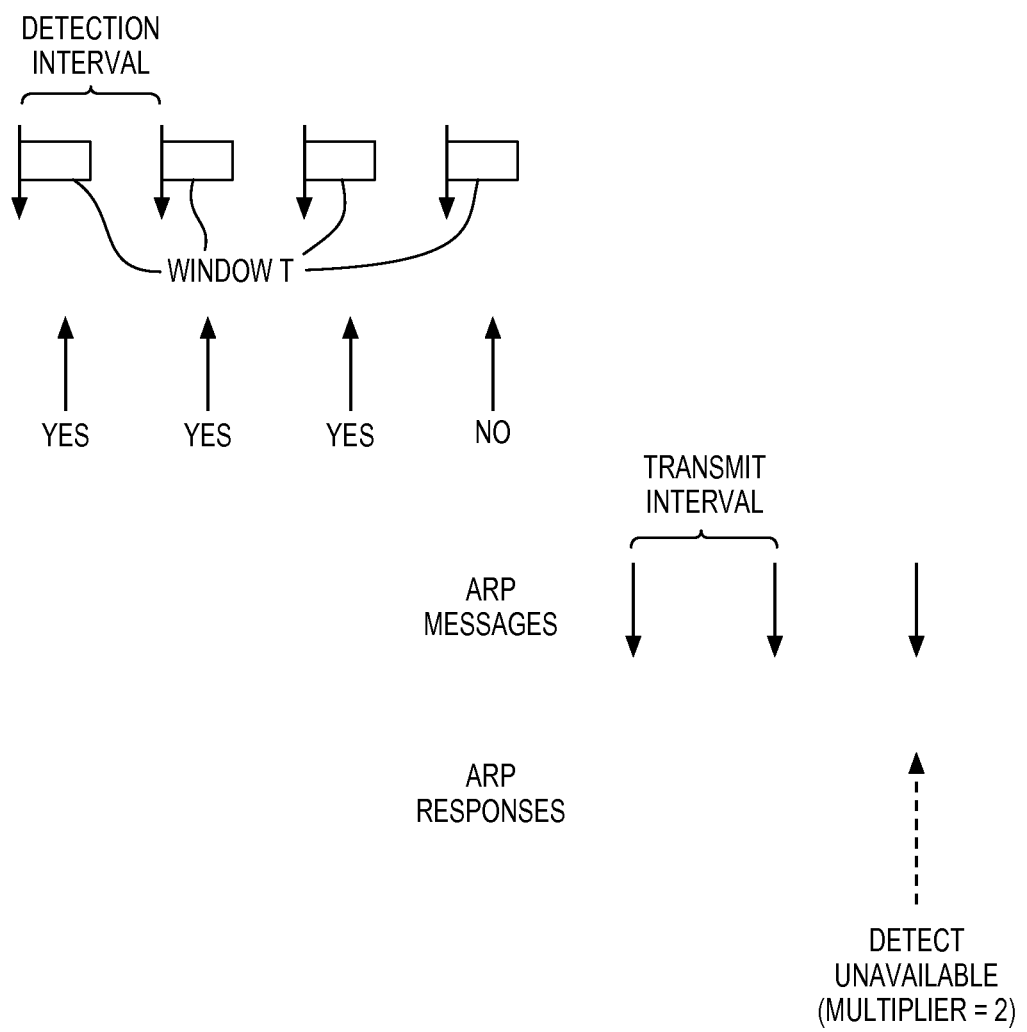

BASE STATIONS ROUTING TRAFFIC OVER A PACKET BACKHAUL NETWORK TO MULTIPLE ROUTING ELEMENTS

BACKGROUND OF THE INVENTION

1. Field of the Invention

The invention is related to the field of communication networks and, in particular, to allowing a base station to route or transmit traffic over a packet backhaul network to multiple routing elements on the Mobile Switching Center (MSC) side of the network.

2. Statement of the Problem

A typical wireless network includes a plurality of base stations that communicate via radio frequencies (RF) to wireless devices, such as cell phones. Each base station also connects to a Mobile Switching Center (MSC) or a similar switching office over a backhaul network. The base station transmits outgoing traffic to the MSC over the backhaul network, and receives incoming traffic from the MSC over the backhaul network. Traditional backhaul networks are comprised of redundant T1 lines between the base station and the MSC.

More recent communication networks use a packet-based network (e.g., an IP network) as the backhaul network. When a packet backhaul network is implemented, a plurality of multilayer switches (MLS) act as gateways for IP packet routing between the packet backhaul network and the MSC. Typical multilayer switches run a Virtual Router Redundancy Protocol (VRRP), or a similar protocol such as Hot Standby Routing Protocol (HSRP), to add gateway redundancy to the packet backhaul network. VRRP creates a virtual router out of a plurality of multilayer switches. The virtual router includes a primary multilayer switch and one or more backup multilayer switches. The virtual router acts as a default gateway to a base station desiring to backhaul traffic to the MSC.

Presently, the base station receives only one gateway IP address from the MSC which is the IP address of the virtual router. The base station determines the MAC address associated with the IP address of the virtual router. The base station then forwards traffic over the packet backhaul network to the MAC address. The primary multilayer switch receives the traffic and forwards it to the destination MSC component based on the destination IP address. The multilayer switches in the virtual router periodically communicate with one another to determine the operating status of each switch. If the primary multilayer switch encounters a failure at some point, then one of the backup multilayer switches identifies the failure and takes the place of the primary multilayer switch. The change from the primary multilayer switch to one of the backup multilayer switches is transparent to the base station, as the base station continues to transmit traffic to the IP address of the virtual router. The backup multilayer switch that is selected to take the place of the primary multilayer switches then provides the routing/gateway functionality to the MSC.

One problem with present communication networks is that the redundancy protocols used, such as VRRP and HSRP, are a limiting factor in how large the backhaul network can grow. For instance, each multilayer switch can run a maximum of 256 VRRP sessions. Each VRRP session is associated with a virtual local area network (VLAN). Each VLAN is associated with a plurality of base stations. The base stations communicate with the multilayer switch over the VLAN. Thus, the limitation of the number of VRRP sessions to 256 limits the number of VLANs available to 256 which in turn limits the number of base stations that can communicate with the multilayer switch. Limiting the number of base stations communicating with the multilayer switch limits the capabilities of the entire network.

SUMMARY OF THE SOLUTION

The invention solves the above and other problems by replacing the redundancy protocol (e.g., VRRP) with additional functionality in the base station. Instead of transmitting outgoing traffic from the base station to a single network IP address of a virtual router, the base stations described herein are adapted to transmit outgoing traffic to multiple multilayer switches (i.e., routing elements) over the packet backhaul network. Thus, if there is a failure in transmitting to one of the routing elements, then the base station may instead transmit traffic to a backup routing element. By adding the functionality to the base station to transmit to multiple routing elements, a redundancy protocol such as VRRP is not needed. The backhaul network may then grow in size and numbers of users without the limitations or constraints of the redundancy protocol.

One embodiment of the invention comprises a method of operating a base station system of a communication network. The communication network includes the base station system, a packet backhaul network, and a plurality of routing elements on the MSC side of the packet backhaul network. One step of the method includes identifying a primary network address for a primary routing element. The primary routing element is the device to which the base station system transmits outgoing traffic under normal operation. Another step of the method includes identifying a backup network address for a backup routing element. The backup routing element is an alternate to the primary routing element in case of a failure of the primary routing element to add redundancy to the communication network. The primary routing element and the backup routing element may be designated by the MSC or another system in the communication network. Another step of the method includes monitoring the availability of the primary routing element for handling traffic. If the primary routing element is found to be available to handle traffic, then the method further includes transmitting outgoing traffic over the packet backhaul network to the primary routing element based on the primary network address. If the primary routing element is found to be unavailable to handle traffic, then the method further includes transmitting outgoing traffic over the packet backhaul network to the backup routing element based on the backup network address.

The invention may include other exemplary embodiments described below.

DESCRIPTION OF THE DRAWINGS

The same reference number represents the same element or same type of element on all drawings.

FIG. 8 illustrates using the incoming traffic and ARP messages to monitor the availability of a routing element in an exemplary embodiment of the invention.

DETAILED DESCRIPTION OF THE INVENTION

FIGS. 1-8 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
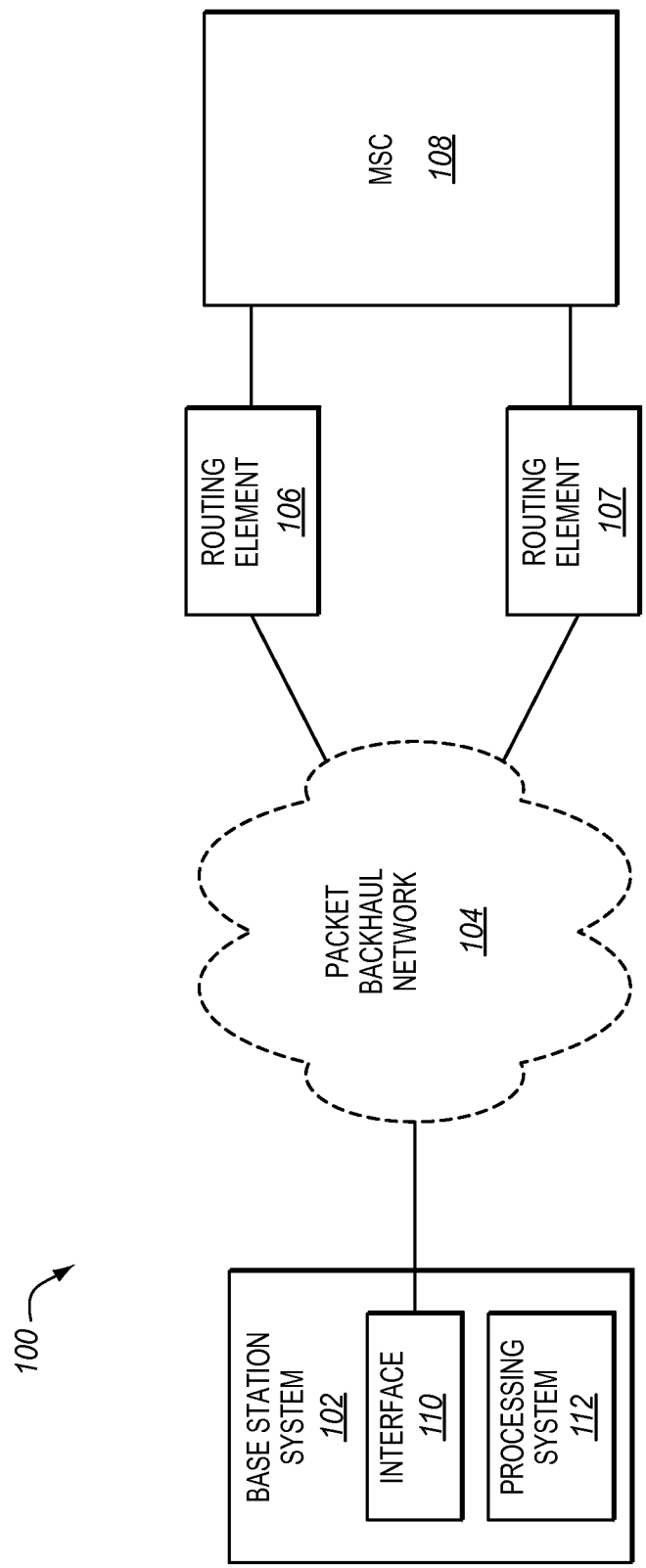
FIG. 1 illustrates a communication network in an exemplary embodiment of the invention.

FIG. 1 illustrates a communication network 100 in an exemplary embodiment of the invention. Communication network 100 comprises a wireless network in this embodiment for providing mobile communications, such as a CDMA or a GSM network, or for providing nomadic communications, such as a WiFi or WiMAX network. Communication network 100 includes a base station system 102, a packet backhaul network 104, routing elements 106-107, and a Mobile Switching Center (MSC) 108. Communication network 100 may include other networks, systems, or devices not shown in FIG. 1. For instance, communication network 100 may include more base station systems and more routing elements, but a single base station system 102 and two routing elements 106-107 are shown merely for illustrative purposes.

Base station system 102 comprises any system adapted to communicate via wireless signals (e.g., RF signals) with wireless communication devices, such as a wireless phone, a wireless PDA, a wireless VoIP phone, etc. Base station system 102 is also adapted to communicate over packet backhaul network 104. In this embodiment, base station system 102 includes an interface 110 and a processing system 112. Interface 110 comprises any device or system adapted to communicate over packet backhaul network 104. Processing system 112 comprises a single processing device or a group of inter-operational processing devices adapted to execute instructions, such as software, program code, or firmware, to operate in a particular manner.

Packet backhaul network 104 comprises any network that routes traffic using packet switching, such as an Internet Protocol (IP) network. Routing elements 106-107 comprise any systems or devices that act as a gateway to receive packets over packet backhaul network 104 and route the packets to MSC 108, and vice-versa. Examples of routing elements 106-107 include a router or a multilayer switch (MLS).

In a traditional communication network, routing elements 106-107 may be grouped together according to a redundancy protocol, such as VRRP, to form a "virtual router" having a common network address. To transmit outgoing traffic over packet backhaul network 104, base station system 102 would transmit the outgoing traffic to the single network address of the virtual router. Routing elements 106-107 would then decide which device would handle the traffic based on the redundancy protocol and would handle failures of a routing element using the protocol. According to this embodiment, use of a redundancy protocol may be avoided as described below.

Instead of designating a single network address for a virtual router as the destination address for outgoing traffic from base station system 102, MSC 108 designates multiple network addresses for outgoing traffic from base station system 102. MSC 108 may designate one of the routing elements (assume routing element 106) as a primary routing element and designate the other routing element 107 as a backup routing element. MSC 108, or a proxy device such as a DHCP server on the MSC side, may then transmit a primary network address for the primary routing element 106 to base station system 102 and transmit a backup network address for the backup routing element 107 to base station system 102. When base station system 102 needs to backhaul traffic to MSC 108, base station system 102 operates as described in FIG. 2.

Figure 2:
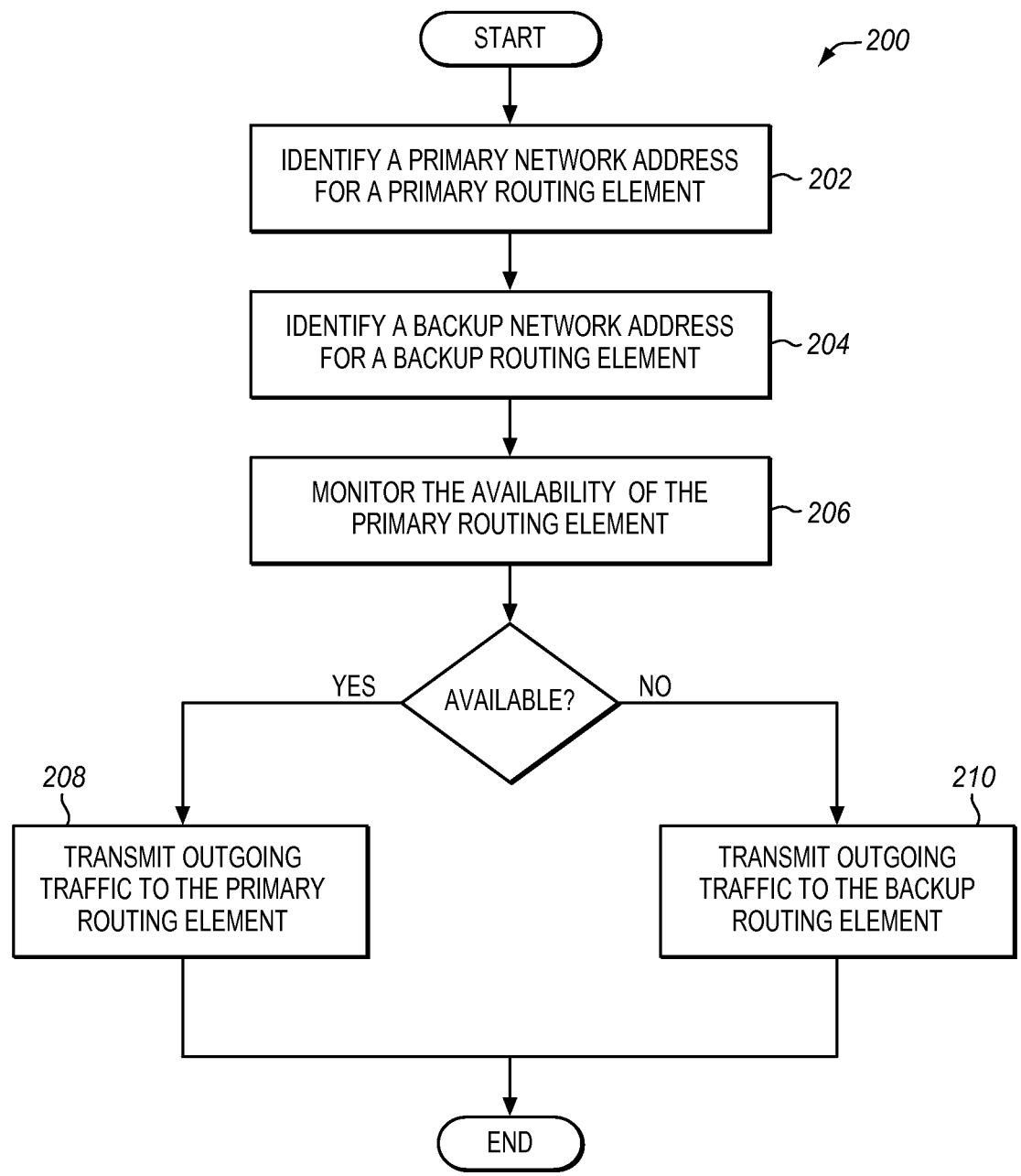
FIG. 2 is a flow chart illustrating a method of operating a base station system in an exemplary embodiment of the invention.

FIG. 2 is a flow chart illustrating a method 200 of operating base station system 102 in an exemplary embodiment of the invention. The steps of method 200 will be described with reference to communication network 100 in FIG. 1. The steps of the flow chart in FIG. 2 are not all inclusive and may include other steps not shown.

In step 202 of method 200, processing system 112 identifies a primary network address for primary routing element 106. The primary routing element 106 is the device to which processing system 112 transmits outgoing traffic under normal operation. Processing system 112 also identifies a backup network address for backup routing element 107 in step 204. The backup routing element 107 is the device that is an alternate to the primary routing element 106 in case of a failure of the primary routing element 106. Processing system 112 may automatically receive the network addresses for the primary routing element 106 and the backup routing element 107 from MSC 108. Alternatively, processing system 112 may query MSC 108 or another system to identify the network addresses of the routing elements 106-107 designated for base station system 102.

In step 206, processing system 112 monitors the availability of primary routing element 106 for handling traffic. Primary routing element 106 may be unavailable for multiple reasons. For instance, primary routing element 106 may have one or more resources that fail, primary routing element 106 may be taken out of service for repair or updates, or may be unavailable for other reasons. Processing system 112 may monitor the availability of primary routing element 106 in a variety of ways, some of which are described below in relation to FIGS. 3-8.

If the primary routing element 106 is available, then processing system 112 transmits outgoing traffic over packet backhaul network 104 to the primary routing element 106 through interface 110 in step 208. Processing system 112 uses the primary network address previously identified for the primary routing element 106 to route the outgoing traffic over a virtual connection on packet backhaul network 104 that terminates at the primary routing element 106.

If the primary routing element 106 is unavailable, then processing system 112 transmits outgoing traffic over packet backhaul network 104 to the backup routing element 107 through interface 110 in step 210. Processing system 112 uses the backup network address previously identified for the backup routing element 107 to route the outgoing traffic over a virtual connection on packet backhaul network 104 that terminates at the backup routing element 107.

Because base station system 102 monitors the availability of the primary routing element 106, a redundancy protocol such as VRRP, may be avoided. Base station system 102 may transmit outgoing traffic to the primary routing element 106 if it is available. If base station system 102 determines that the primary routing element 106 is unavailable or becomes unavailable at some point, then base station system 102 may redirect the outgoing traffic to the backup routing element 107. The ability of base station system 102 to transmit outgoing traffic to multiple routing elements 106-107 thus adds the redundancy desired over packet backhaul network 104 instead of a conventional redundancy protocol. The disadvantages of the redundancy protocols may advantageously be avoided and packet backhaul network 104 may be used more efficiently.

Figure 3:
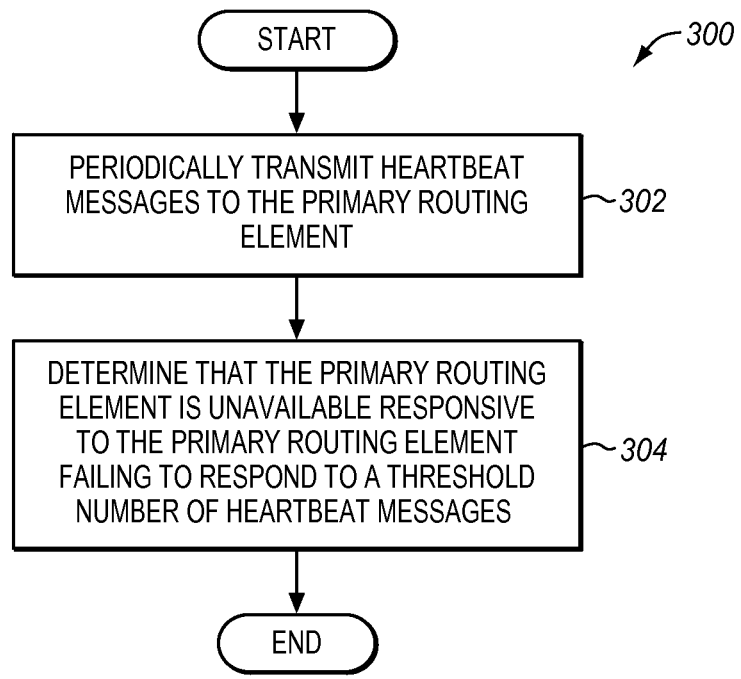
FIG. 3 is a flow chart illustrating a method of monitoring the availability of a routing element in an exemplary embodiment of the invention.

FIG. 3 is a flow chart illustrating a method 300 of monitoring the availability of a routing element in an exemplary embodiment of the invention. In step 302 of method 300, processing system 112 (see FIG. 1) periodically transmits heartbeat messages through interface 110 to the primary routing element 106 based on the primary network address. In step 304, processing system 112 determines that the primary routing element 106 is unavailable responsive to the primary routing element 106 failing to respond to a threshold number of the heartbeat messages.

Figure 4:
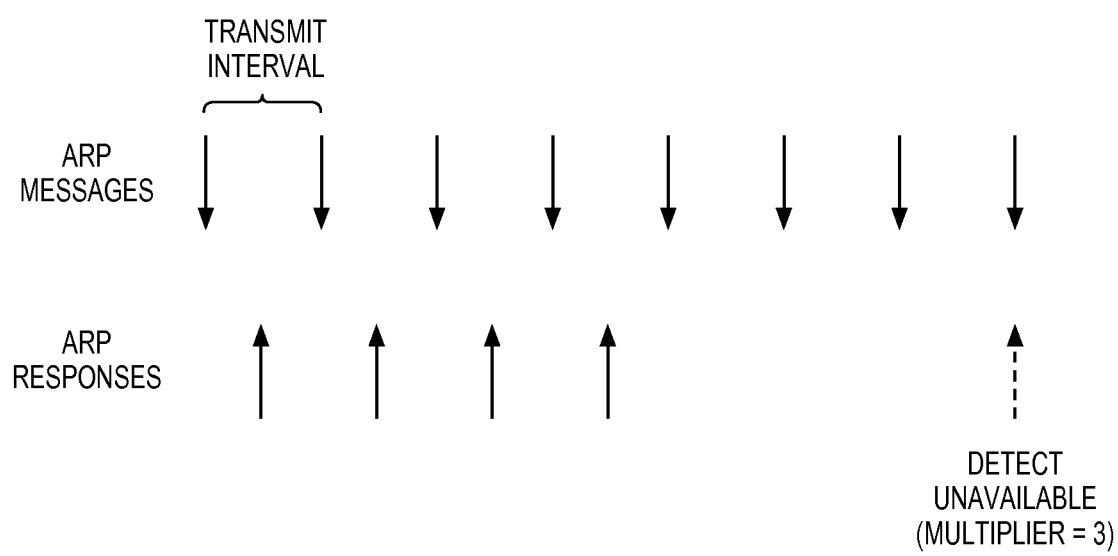
FIG. 4 illustrates using ARP messages to monitor the availability of a routing element in an exemplary embodiment of the invention.

In an example of method 300, assume that the heartbeat messages comprise Address Resolution Protocol (ARP) messages. Two variables used in the Address Resolution Protocol (ARP) are a multiplier and a transmit interval. Processing system 112 periodically transmits ARP messages to the primary routing element 106 according to the transmit interval. FIG. 4 illustrates using ARP messages to monitor the availability of a routing element in an exemplary embodiment of the invention. The top row of arrows illustrates the ARP messages sent by processing system 112 to the primary routing element 106. The time between transmissions of the ARP messages depends on the specified time interval. The bottom row of arrows illustrates ARP responses from the primary routing element 106. For the first four ARP messages sent by processing system 112, the primary routing element 106 responds with an ARP response. Then for three ARP messages in a row, the primary routing element 106 does not respond. Because the multiplier is three in this example, processing system 112 determines that the primary routing element 106 is unavailable after the third consecutive non-response from the primary routing element 106.

Figure 5:
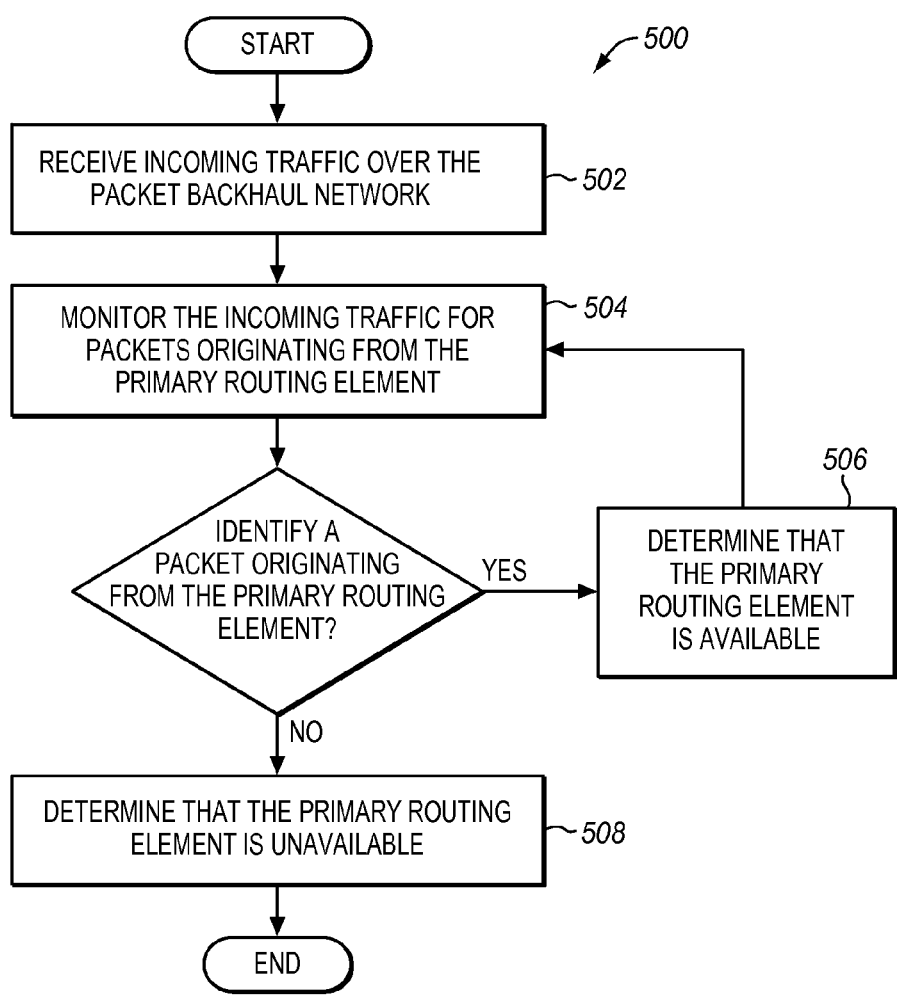
FIG. 5 is a flow chart illustrating another method of monitoring the availability of a routing element in an exemplary embodiment of the invention.

FIG. 5 is a flow chart illustrating another method 500 of monitoring the availability of a routing element in an exemplary embodiment of the invention. In step 502 of method 500, processing system 112 (see FIG. 1) receives incoming traffic over packet backhaul network 104 through interface 110. Incoming traffic comprises traffic that originates from the MSC side of the packet backhaul network and is routed to base station system 102. In step 504, processing system 112 monitors the incoming traffic for packets originating from the primary routing element 106. If processing system 112 identifies one or more packets in the incoming traffic within the threshold time period that originated from the primary routing element 106, then processing system 112 determines that the primary routing element 106 is available in step 506. Processing system 112 then continues to monitor the incoming traffic in another time period. If processing system 112 fails to identify one or more packets in the incoming traffic within a threshold time period that originated from the primary routing element 106, then processing system 112 determines that the primary routing element 106 is unavailable in step 508.

Figure 6:
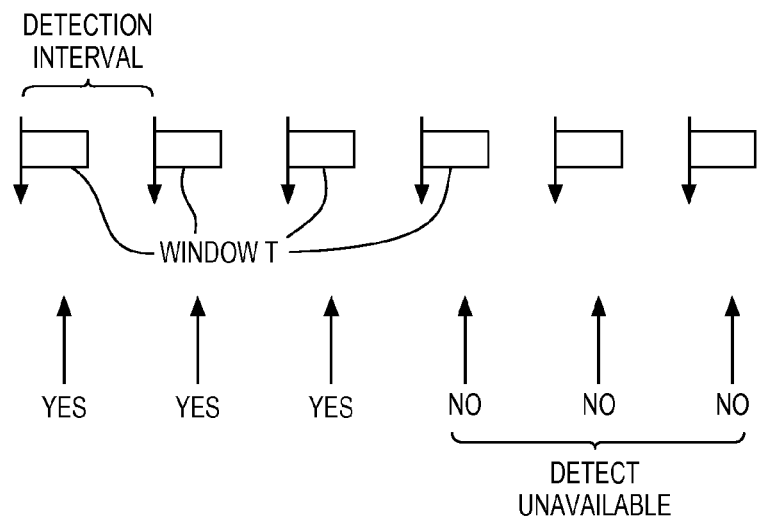
FIG. 6 illustrates using incoming traffic to monitor the availability of a routing element in an exemplary embodiment of the invention.

In one example of method 500, assume that processing system 112 receives incoming traffic over packet backhaul network 104 through interface 110. The incoming traffic may have originated from routing element 106, routing element 107, or another routing element not shown in FIG. 1. Responsive to receiving the incoming traffic, processing system 112 monitors the MAC addresses in the packets of the incoming traffic to determine where the packets originated. In this example, processing system 112 monitors the MAC addresses at a detection interval. At the occurrence of a detection interval, processing system 112 monitors the packets of the incoming traffic that are received during a detection window T. FIG. 6 illustrates using the incoming traffic to monitor the availability of a routing element in an exemplary embodiment of the invention. The top row of arrows illustrates the detection interval. At the beginning of each detection interval, processing system 112 monitors the packets of the incoming traffic for a window T. The use of window T is to ensure that there will be a high probability that at least one packet arrives within the window. The value of window T can be chosen based on the traffic arrival statistics of communication network 100. The bottom row of arrows illustrates whether or not processing system 112 identifies one or more packets that originated from the primary routing element 106 during window T of each detection interval. For the first three detection intervals, processing system 112 identifies one or more packets that originated from the primary routing element 106 during window T. Then for the next three detection intervals, processing system 112 does not identify a packet that originated from the primary routing element 106 during window T. Thus, processing system 112 determines that the primary routing element 106 is unavailable after the third consecutive window T with no packet detected.

Figure 7:
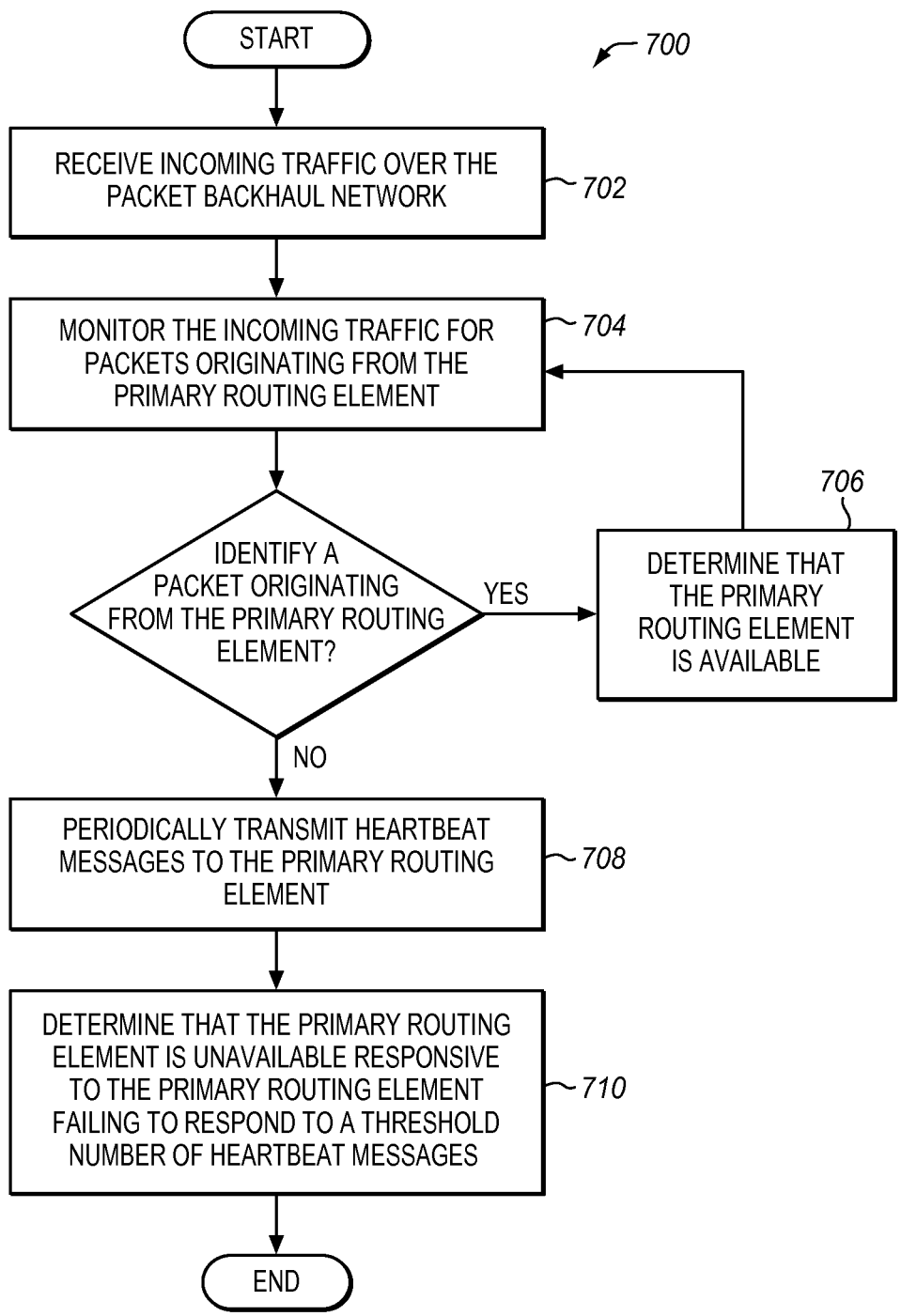
FIG. 7 is a flow chart illustrating another method of monitoring the availability of a routing element in an exemplary embodiment of the invention.

FIG. 7 is a flow chart illustrating a method 700 of monitoring the availability of a routing element in an exemplary embodiment of the invention. Method 700 is a hybrid of method 300 and method 500 described above. In step 702 of method 700, processing system 112 (see FIG. 1) receives incoming traffic over packet backhaul network 104 through interface 110. In step 704, processing system 112 monitors the incoming traffic for packets originating from the primary routing element 106. If processing system 112 identifies one or more packets in the incoming traffic within a threshold time period that originated from the primary routing element 106, then processing system 112 determines that the primary routing element 106 is available in step 706. Processing system 112 then continues to monitor the incoming traffic in another time period.

If processing system 112 fails to identity one or more packets in the incoming traffic within a threshold time period that originated from the primary routing element 106, then processing system 112 periodically transmits heartbeat messages through interface 110 to the primary routing element 106 in step 708. In step 710, processing system 112 determines that the primary routing element 106 is unavailable responsive to the primary routing element 106 failing to respond to a threshold number of the heartbeat messages.

In an example of method 700, assume that processing system 112 (see FIG. 1) receives incoming traffic over packet backhaul network 104 through interface 110. Responsive to receiving the incoming traffic, processing system 112 monitors the MAC addresses in the packets of the incoming traffic at a detection interval to determine where the packets originated. At the occurrence of a detection interval, processing system 112 monitors the packets that are received during a detection window T. FIG. 8 illustrates using the incoming traffic and ARP messages to monitor the availability of a routing element in an exemplary embodiment of the invention. The top row of arrows illustrates the detection interval. At the beginning of each detection interval, processing system 112 monitors the packets of the incoming traffic for a window T. The middle row of arrows illustrates whether or not processing system 112 identifies one or more packets that originated from the primary routing element 106 during window T of each detection interval. For the first three detection intervals, processing system 112 identifies one or more packets that originated from the primary routing element 106 during window T. In the fourth detection interval, processing system 112 does not identify a packet that originated from the primary routing element 106 during window T. As a result, processing system 112 periodically transmits ARP messages to the primary routing element 106 according to a transmit interval. The bottom row of arrows illustrates the ARP messages sent by processing system 112 to the primary routing element 106. In this example, the primary routing element 106 does not respond to the first two ARP messages. Because the multiplier is two in this example, processing system 112 determines that the primary routing element 106 is unavailable after the second consecutive non-response from the primary routing element 106.

Although specific embodiments were described herein, the scope of the invention is not limited to those specific embodiments. The scope of the invention is defined by the following claims and any equivalents thereof.

We claim:

1. A method of operating a base station system of a wireless communication network to transmit traffic over a packet backhaul network to a Mobile Switching Center (MSC), the method comprising:
   identifying a primary network address for a primary routing element that terminates a first virtual connection from the base station system at the MSC over the packet backhaul network;
   identifying a backup network address for a backup routing element that terminates a second virtual connection from the base station system at the MSC over the packet backhaul network;
   using heartbeat messages to monitor the availability of the primary routing element for handling traffic between the base station system and the MSC;
   transmitting outgoing traffic over the packet backhaul network to the primary routing element based on the primary network address responsive to the primary routing element being available; and
   transmitting outgoing traffic over the packet backhaul network to the backup routing element based on the backup network address responsive to the primary routing element being unavailable.

2. The method of claim 1 wherein using heartbeat messages to monitor the availability of the primary routing element for handling traffic comprises:
   periodically transmitting heartbeat messages to the primary routing element over the packet backhaul network based on the primary network address; and
   determining that the primary routing element is unavailable responsive to the primary routing element failing to respond to a threshold number of the heartbeat messages.

3. The method of claim 2 wherein the heartbeat messages comprise Address Resolution Protocol (ARP) messages.

4. The method of claim 1 wherein using heartbeat messages to monitor the availability of the primary routing element for handling traffic comprises:
   receiving incoming traffic over the packet backhaul network;
   monitoring the incoming traffic for packets originating from the primary routing element; and
   determining that the primary routing element is unavailable responsive to failing to identify at least one packet in the incoming traffic within a threshold time period that originated from the primary routing element.

5. The method of claim 4 wherein monitoring the incoming traffic for packets originating from the primary routing element comprises:
   monitoring the incoming traffic to identify packets having a MAC address for the primary routing element.

6. The method of claim 1 wherein using heartbeat messages to monitor the availability of the primary routing element for handling traffic comprises:
   receiving incoming traffic over the packet backhaul network;
   monitoring the incoming traffic for packets originating from the primary routing element;
   periodically transmitting heartbeat messages to the primary routing element over the packet backhaul network responsive to failing to identify at least one packet in the incoming traffic within a threshold time period that originated from the primary routing element; and
   determining that the primary routing element is unavailable responsive to the primary routing element failing to respond to a threshold number of the heartbeat messages.

7. A base station system, comprising:
   an interface adapted to communicate with a primary routing element that terminates a first virtual connection at a Mobile Switching Center (MSC) over a packet backhaul network and to communicate with a backup routing element that terminates a second virtual connection at the MSC over a packet backhaul network; and
   a processing system adapted to identify a primary network address for the primary routing element, to identify a backup network address for the backup routing element, to use heartbeat messages to monitor the availability of the primary routing element for handling traffic between the base station system and the MSC, to transmit outgoing traffic through the interface over the packet backhaul network to the primary routing element based on the primary network address responsive to a determination that the primary routing element is available, and to transmit outgoing traffic through the interface over the packet backhaul network to the backup routing element based on the backup network address responsive to a determination that the primary routing element is unavailable.

8. The base station system of claim 7 wherein the processing system is further adapted to:
   periodically transmit heartbeat messages through the interface to the primary routing element based on the primary network address; and
   determine that the primary routing element is unavailable responsive to the primary routing element failing to respond to a threshold number of the heartbeat messages.

9. The base station system of claim 8 wherein the heartbeat messages comprise Address Resolution Protocol (ARP) messages.

10. The base station system of claim 7 wherein the processing system is further adapted to:
    receive incoming traffic through the interface over the packet backhaul network;

monitor the incoming traffic for packets originating from the primary routing element; and determine that the primary routing element is unavailable responsive to failing to identify at least one packet in the incoming traffic within a threshold time period that originated from the primary routing element.

11. The base station system of claim 10 wherein the processing system is further adapted to:

monitor the incoming traffic to identify packets having a MAC address for the primary routing element.

12. The base station system of claim 7 wherein the processing system is further adapted to:

receive incoming traffic through the interface over the packet backhaul network;

monitor the incoming traffic for packets originating from the primary routing element;

periodically transmit heartbeat messages through the interface over the packet backhaul network to the primary routing element responsive to failing to identify at least one packet in the incoming traffic within a threshold time period that originated from the primary routing element; and determine that the primary routing element is unavailable responsive to the primary routing element failing to respond to a threshold number of the heartbeat messages.

13. A communication network, comprising:

a base station system;

a packet backhaul network coupled to the base station system; and a plurality of routing elements coupled to the packet backhaul network and a mobile switching center (MSC), wherein each of the routing elements terminates a virtual connection from the base station system at the MSC;

the base station system adapted to use heartbeat messages for monitoring monitor the availability of a first one of the routing elements to receive outgoing traffic from the base station system to the MSC over the packet backhaul network, to transmit the outgoing traffic over the packet backhaul network to the first one of the routing elements responsive to the first one of the routing elements being available, and to transmit the outgoing traffic over the packet backhaul network to a second one of the routing elements responsive to the first one of the routing elements being unavailable.

14. The communication network of claim 13 wherein the base station system is further adapted to:

periodically transmit heartbeat messages to the first one of the routing elements over the packet backhaul network; and determine that the first one of the routing elements is unavailable responsive to the first one of the routing elements failing to respond to a threshold number of the heartbeat messages.

15. The communication network of claim 14 wherein the heartbeat messages comprise Address Resolution Protocol (ARP) messages.

16. The communication network of claim 13 wherein the base station system is further adapted to:

receive incoming traffic over the packet backhaul network;

monitor the incoming traffic for packets originating from the first one of the routing elements; and determine that the first one of the routing elements is unavailable responsive to failing to identify at least one packet in the incoming traffic within a threshold time period that originated from the first one of the routing elements.

17. The communication network of claim 16 wherein the base station system is further adapted to:

monitor the incoming traffic to identify packets having a MAC address for the first one of the routing elements.

18. The communication network of claim 13 wherein the base station system is further adapted to:

receive incoming traffic over the packet backhaul network;

monitor the incoming traffic for packets originating from the first one of the routing elements;

periodically transmit heartbeat messages to the first one of the routing elements over the packet backhaul network responsive to failing to identify at least one packet in the incoming traffic within a threshold time period that originated from the first one of the routing elements; and determine that the first one of the routing elements is unavailable responsive to the first one of the routing elements failing to respond to a threshold number of the heartbeat messages.

19. The communication network of claim 13 wherein the packet backhaul network comprises an Ethernet network.

20. The communication network of claim 13 further comprising:

a mobile switching center (MSC) adapted to designate the first one of the routing elements as a primary routing element, to designate the second one of the routing elements as a backup routing element, and to transmit a network address for the first one of the routing elements and a network address for the second one of the routing elements to the base station system.

* * * * *